United States Patent [19]
Brinegar

[11] Patent Number: 6,000,495
[45] Date of Patent: Dec. 14, 1999

[54] SCAFFOLDING SYSTEM

[75] Inventor: David A. Brinegar, Fayette, Ohio

[73] Assignee: Bil-Jax, Inc., Archbold, Ohio

[21] Appl. No.: 09/010,787

[22] Filed: Jan. 22, 1998

[51] Int. Cl.$^6$ .................................................. E06C 7/16
[52] U.S. Cl. ........................ 182/119; 182/113; 182/179; 182/222; 52/464; 403/381
[58] Field of Search .................. 182/115, 113, 182/119, 123, 132, 179, 222, 223; 52/464, 461; 403/287, 227, 341, 362, 375, 381

[56] References Cited

U.S. PATENT DOCUMENTS

| | | | |
|---|---|---|---|
| 2,339,865 | 1/1944 | Larmour | 52/464 |
| 2,738,832 | 3/1956 | Torkelson | 182/222 |
| 4,372,424 | 2/1983 | Langer | 182/222 X |
| 4,409,906 | 10/1983 | Alneng | 52/461 X |
| 4,445,590 | 5/1984 | Ihrman | 182/222 |
| 4,455,803 | 6/1984 | Kornberger | 52/464 X |
| 4,825,976 | 5/1989 | Wyse | 182/119 X |
| 4,959,941 | 10/1990 | Schoeneberg | 182/119 X |
| 4,984,654 | 1/1991 | Anderson | 182/222 X |
| 5,145,032 | 9/1992 | Puccinelli et al. | 182/119 X |
| 5,279,193 | 1/1994 | Huffine | 182/119 |
| 5,704,449 | 1/1998 | Ono | 182/119 |
| 5,762,441 | 6/1998 | Karlsen et al. | 182/119 X |

FOREIGN PATENT DOCUMENTS 250612 1/1988 European Pat. Off. ............... 182/222

OTHER PUBLICATIONS

Safety Rules And Instructions #975 for Sprint Modular Frame Scaffold ® 1996 Patent Construction System. Harsco Corporation.
SL 70/SL 100 The versatile frame scaffold plettac AG Division of Scaffolding and Formwork Technology.

Primary Examiner—Daniel P. Stodola
Assistant Examiner—Bruce A. Lev
Attorney, Agent, or Firm—Emch, Schaffer, Schaub & Porcello Co., L.P.A.

[57] ABSTRACT

A scaffolding system having a first frame connected to a second frame with at least one platform disposed therebetween. The first frame includes a first set of posts connected together by an upper cross member. The second frame includes a second set of posts connected together by a lower cross member. The platform is adapted to be detachably secured to the upper cross member and sandwiched between the upper cross member and the lower cross member such that an upper surface of the lower cross member is generally flush with the platform, thus forming a continuous walking surface. The lower cross member prevents removal of the platform while the second frame is connected to the first frame.

4 Claims, 2 Drawing Sheets

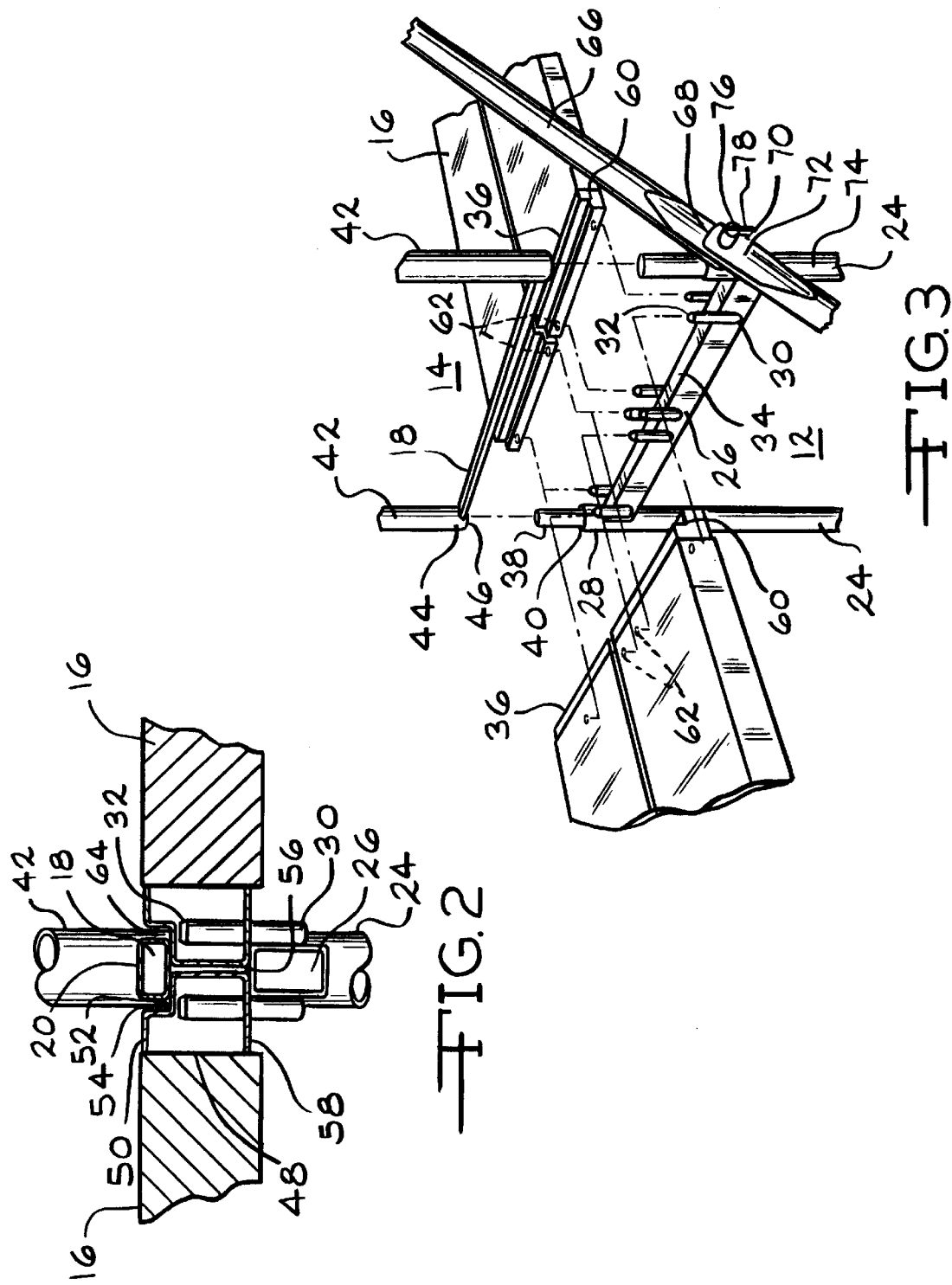

SCAFFOLDING SYSTEM

FIELD OF THE INVENTION

The present invention relates to generally to a scaffolding system, and more particularly to a scaffolding system that has a platform secured between cross members of two frames such that an upper surface of one of the cross members is flush with the surface of the platform to provide a continuous walking surface.

BACKGROUND OF THE INVENTION

Scaffolding systems are known in the construction industry for providing access to an elevated work space, such as the outside of a building. Because of ever-increasing construction costs, cost-efficient scaffolding systems that can be quickly assembled are highly desirable.

One known scaffolding system provides for separate frame units that can be joined together without requiring any tools. In this type of system, a bottom frame is provided with a horizontal bar. The horizontal bar has a plurality of stud connections attached thereto. A platform having a mounting bracket is engaged with the stud connections such that the studs extend through the mounting bracket, thereby attaching the platform to the bottom frame. A top frame is then attached to the top of the bottom frame. The disadvantage to such a system is that a horizontal bar of the top frame, which is necessary to hold the top frame together and for maintaining the structural stability of the frame unit, is disposed above an upper surface of the platform. This horizontal bar makes it awkward for workers to travel along the platform sections as they must stop and step over the horizontal bar when walking to and from other sections of the scaffolding system. This is especially true when the worker is carrying heavy equipment from one work area to another.

In another known scaffolding system the horizontal bar of the bottom unit is provided with a U-shaped cross section. The horizontal bar of the top unit has a T-shaped cross section, such that a bottom leg of the T can extend into a trough formed by the U-shaped horizontal bar. Top flanges of the T-shaped bar further include spaced apart notches in which integral hooks, which are formed on ends of the platforms, are received. Once the hooks are positioned in the notches, the platform is slid laterally away from the notches such that the hooks of the platform are trapped between the T-shaped horizontal bar and the U-shaped horizontal bar. In this type of arrangement, the obstruction of the elevated horizontal bar is reduced to having to step over a small lip formed between the top surface of the T-shaped bar and the platform surface. However, this system is more costly to manufacture than other scaffolding systems, due to the varying shapes of the horizontal bars. Further, there is no means for preventing someone from easily tampering with the platforms nor for preventing the hooks from unintentionally sliding back into alignment with the notches whereby the platforms can accidentally become dislodged from the U-shaped bar, resulting in a loss of the bracing effect which the platforms provide when they are properly engaged with the frames.

Therefore, there exists a need for a scaffolding system which is quickly and easily assembled, cost-efficient to manufacture, and has a continuous, uninterrupted walking surface. Further, a scaffolding system is needed which serves to securely retain the platform in place on the frames, as well as reduce the likelihood of tampering.

SUMMARY OF THE INVENTION

The present invention is directed to a scaffolding system having a first frame connected to a second frame with a platform secured therebetween. The first frame includes a first set of posts connected together by an upper cross member. Preferably, the upper cross member has a continuous rectangular cross-section, thereby being cost-efficient to manufacture. Upper ends of the posts preferably have a neck portion that is receivable by the second frame such that the first and second frame may be quickly and easily connected together. The second frame has a second set of posts that are connected together by a lower cross member. Preferably, the lower cross member also has a continuous rectangular cross section further reducing manufacturing costs. A flange is connected to the end of the platform, the flange adapted to be detachably secured to the upper cross member. Preferably the upper cross member is provided with a plurality of mounting protrusions that are receivable by the flange such that the platforms may be secured to the first frame quickly and easily, and without requiring any tools.

In assembling the scaffolding system, the flange of the platform is secured to the upper cross member of the first frame. The second frame is then connected to the first frame. The flange is shaped to cooperate with the lower cross member such that a top surface of the cross member is generally flush with the a top surface of the platform, while a portion of the flange remains sandwiched between the upper and lower cross members. Thus, a continuous walkway is formed, while accidental dislodgment of the platform is eliminated. Further, the likelihood of tampering is reduced as the second frame must be completely removed in order to remove the platform.

BRIEF DESCRIPTION OF THE DRAWINGS

The features and inventive aspects of the present invention will become more apparent upon reading the following detailed description, claims, and drawings, of which the following is a brief description:

FIG. 2 is a cross-sectional view of the scaffolding system.

FIG. 3 is an exploded view of the scaffolding system.

DETAILED DESCRIPTION OF PREFERRED EMBODIMENTS

Figure 1:
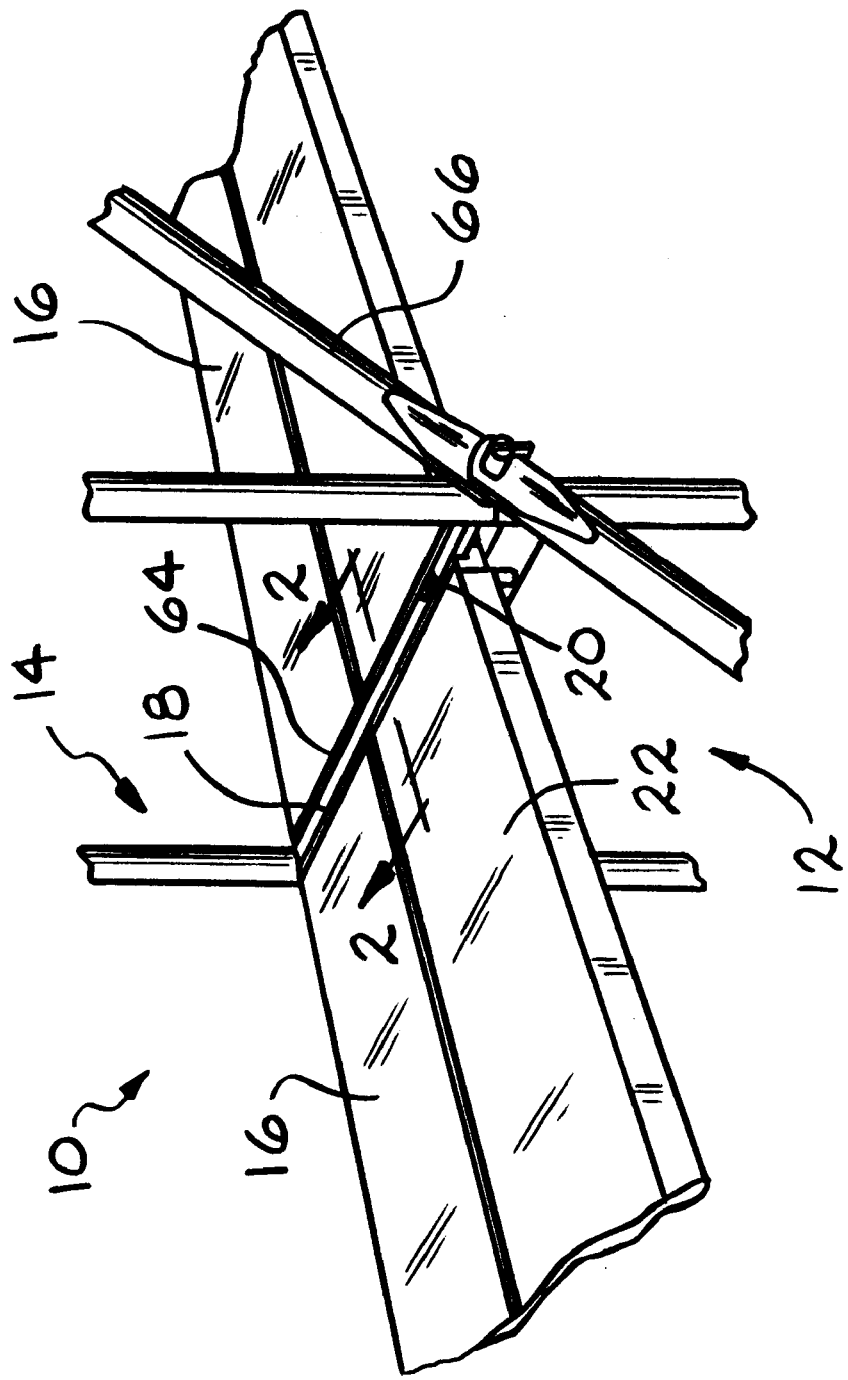
FIG. 1 is a perspective view of an assembled scaffolding system in accordance with the present invention.

FIG. 1 shows a section of a scaffolding system 10 with a first frame 12 connected to a second frame 14. Platforms 16, which serve as walkways and supply structural rigidity to the scaffolding system, are secured between first frame 12 and second frame 14. A lower cross member 18 of second frame 14 is disposed between platforms 16 such that a top surface 20 of lower cross member 18 is generally flush with an upper surface 22 of platforms 16. Thus, a continuous, uninterrupted walking surface is formed between frames 12 and 14.

Referring to FIGS. 2 and 3, first frame 12 includes a first set of vertical posts 24 connected together by an upper cross member 26. Cross member 26 is positioned generally at upper ends 28 of posts 24 and is connected thereto by welding or other suitable means. Cross member 26 further includes a plurality of mounting protrusions or studs 30 attached thereto. Studs 30 each have an upper portion 32 that extends above a top surface 34 of cross member 26 that are engagable with flanges 36, to be discussed later in greater detail. Preferably, studs 30 have a star-shaped cross-section which cooperates with flanges 36 to establish a rigid connection between flange 36 and cross member 26. Further, cross member 26 preferably has a continuous rectangular cross section such that its top surface 34 is substantially planar to provide a surface to support flanges 36. The uniform cross section of cross member 26 is also cost-efficient to manufacture. Upper ends 28 of posts 24 include a reduced-diameter neck 38 which forms a shoulder 40.

Second frame 14 includes a second set of vertical posts 42. Posts 42 are connected together by lower cross member 18, which is positioned generally at lower ends 44 of posts 42 and is connected thereto by welding or other suitable means. Cross member 18 preferably has a continuous rectangular cross-section which is easily manufactured thereby reducing manufacturing costs. Lower ends 44 further include a recess 46 which is adapted to receive neck 38 in a telescoping engagement, thereby connecting first frame 12 to second frame 14. When lower ends 44 are engaged with neck 38, shoulder 40 serves to position and support second frame 14.

Flanges 36 are attached to ends 48 of platforms 16. In the preferred embodiment, flanges 36 have an L- shaped cross section and include a first surface 50, a second surface 52, a side wall 54, an end surface 56, and a bottom surface 58. First surface 50 is substantially flush with upper surface 22 of platform 16. Second surface 52 is positioned below first surface 50 such that a step 60 is formed. Preferably, bottom surface 58 includes a plurality of apertures 62 that are adapted to receive studs 30 such that platform 16 may be detachably secured to first frame 12 quickly and easily, without requiring any tools.

When flanges 36 are engaged with studs 30, bottom surfaces 58 are in contact with upper surface 34 of upper cross member 26. End surfaces 56 are positioned adjacent to one another in an end-to-end relationship such that second surfaces 52 cooperate with side walls 54 to form a channel 64. Channel 64 has generally the same dimensions of lower cross member 18 such that cross member 18 fits within channel 64 and upper surface 20 of cross member 18 is generally flush with first surface 50 of flange 36, thereby forming a continuous walking surface between frames 12 and 14. Further, lower cross member 18 additionally serves to secure platforms 16 to frames 12 and 14 to prevent accidental dislodgment or tampering of platforms 16, by sandwiching (but not bearing upon) a portion of flange 36 between upper and lower cross members 26 and 18. Second frame 14 must be completely removed from first frame 12 in order to release flanges 36 and remove platforms 16.

Ends 48 of platforms 16 are provided with flanges 36 to provide a strong and durable connection point for securing platforms 16 to upper cross member 26. However, it is understood that platforms 16 could be manufactured with step 60 integral with platform 16 such that a section of ends 48 act as side walls 54 to form channel 64. Further, rectangular flanges 36 having a smaller thickness than that of platform 16 could be provided and attached at a lower portion of ends 48 such that ends 48 themselves serve as side walls 54 to form channel 64.

Scaffolding system 10 may further include optional cross braces 66 to provide additional stability. Each cross brace 66 has ends 68 with an aperture 70 therethrough. Ends 68 are preferably beveled such that flat engaging surfaces 72 are formed, thereby making it easier to connect multiple cross braces 66 together. Upper ends 28 of first frames 12 are provided with a locking pin 76 disposed on the outside surface 74 of posts 24. Surface 72 of one end 68 is positioned in contact with outside surface 74 such that aperture 70 may be slipped over pin 76 to secure cross braces 66. As is conventional, pin 76 has a pivoting retention tab 78 on its outer end which is gravity-biased to hang vertically so that brace 66 cannot accidentally slip off pin 76 and post 24. The opposite end of cross brace 66 (not shown) is extended towards another set of assembled frames (not shown), and flat engaging surface 72 is connected in an identical manner as described above.

Preferred embodiments of the present invention have been disclosed. A person of ordinary skill in the art would realize, however, that certain modifications would come within the teachings of this invention. Therefore, the following claims should be studied to determine the true scope and content of the invention.

What is claimed is:

1. A scaffolding system, comprising:
    at least one first frame having a first set of posts connected together by an upper cross member, said first set of posts having a specified first outside dimension, each post defining an upper end having a second outside dimension less than said first outside dimension thereby defining a shoulder between said first and second outside dimensions, said upper cross member engaged between said first set of posts below said shoulder at said first outside dimension, said upper cross member including a plurality of upwardly projecting mounting protrusions generally aligned in two parallel rows;
    at least one second frame having a second set of posts connected together by a lower cross member having a top surface and a bottom surface, each of said second set of posts defining a lower end having a recess the inside dimension of which is slightly larger than the second outside dimension of said first set of posts, whereby said recess engages with said upper end of said first set of posts when said first frame and said second frame are assembled such that said shoulder serves to support said second frame, said lower cross member engaged between said second set of posts such that the bottom surface of said lower cross member is positioned proximate said shoulder when said first and second frames are assembled; and
    at least two platforms, each having an upper load-bearing surface and opposed ends, each of said ends having a plurality of downwardly opening apertures adapted to receive said mounting protrusions when said platforms are lowered onto said first frame in an end-to-end relationship, the engagement between said protrusions and said apertures acting to prevent lateral movement of said secured platforms relative to said first frame;
    each of said ends further being L-shaped such that when said ends are positioned together, a U-shaped channel is formed, the lower upper surface of which is generally aligned with said shoulder and is adapted to receive said lower cross member such that said top surface of said lower cross member is generally flush with said upper surface of said platforms when said second frame is engaged with said first frame after said platforms are secured to said first frame.

2. The scaffolding system of claim 1, wherein said mounting protrusions project upwardly from said upper cross member and said platform apertures are located to open downwardly so that the platforms may be secured to said first frame by lowering them onto said mounting projections, said apertures being dimensioned to prevent lateral movement of the platforms relative to said first frame, and said lower cross member being positioned immediately above adjacent ends of the platforms when said second frame is connected to said first frame whereby the platforms cannot be removed from said first frame without first removing said second frame from said first frame.

3. The scaffolding system of claim 1, wherein said lower cross member has a generally rectangular cross-sectional shape.

4. The scaffolding system of claim 1, wherein the platforms have respective upper load bearing surfaces and the ends of said platforms are recessed below said upper load bearing surfaces a sufficient distance to permit said lower cross member to be substantially flush with said upper load bearing surfaces, when said second frame is connected to said first frame.

* * * * *